Dec. 31, 1968    W. M. HERPICH    3,418,869
STUD AND SLEEVE ASSEMBLY
Filed March 22, 1966
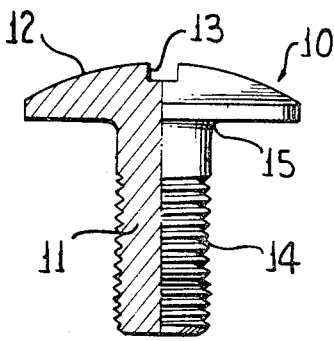
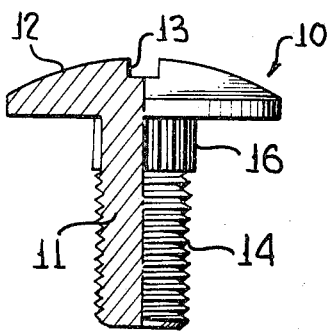
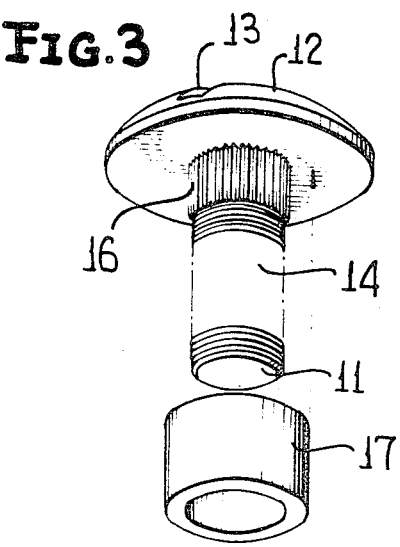
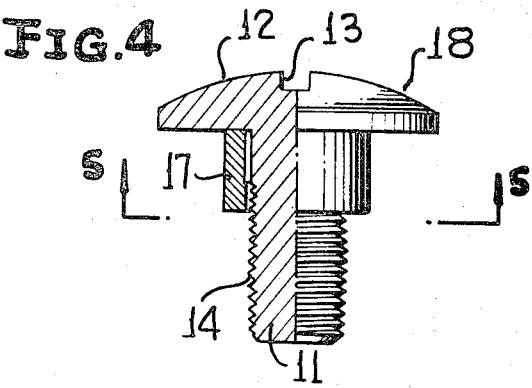
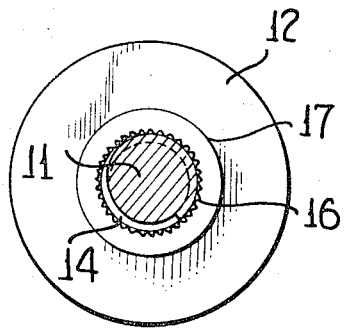
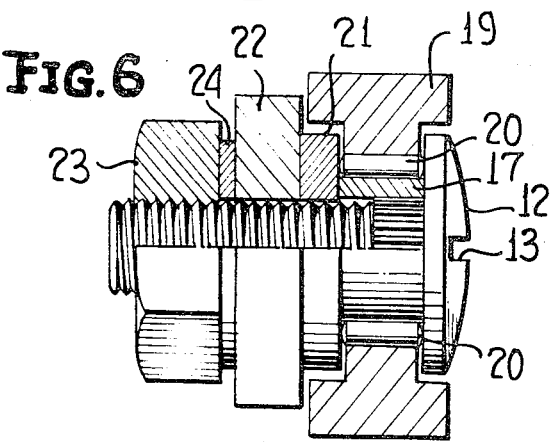
INVENTOR
WILLIAM M. HERPICH
BY Mason, Porter, Diller & Brown
ATTORNEYS

United States Patent Office 3,418,869
Patented Dec. 31, 1968

3,418,869
STUD AND SLEEVE ASSEMBLY
William M. Herpich, Litchfield, Conn., assignor to The Torrington Company, Torrington, Conn., a corporation of Maine
Filed Mar. 22, 1966, Ser. No. 536,340
2 Claims. (Cl. 74—569)

ABSTRACT OF THE DISCLOSURE

A stud and sleeve assembly, for use as components of a cam follower. The stud includes an enlarged head, a knurled portion adjacent the head, and a threaded connection portion. The sleeve is press-fitted over the knurled portion and has a hardened outer surface, forming an inner race for rolling elements. The knurled portion may comprise axially extending ribs and have a somewhat greater diameter than the threaded connection portion of the stud shank.

---

This invention relates to a stud and sleeve assembly which is useful in applications requiring a stud whose shank has been hardened or ground to close tolerances.

In the manufacture of cam followers and similar articles, it is necessary to provide a stud whose shank has been hardened and ground to close tolerances to act as the inner race of a cam follower bearing assembly. In the past, such studs have been relatively expensive for several reasons. In the first place, it was necessary to form the studs from a high grade nickel molybdenum steel which was carburized to provide a hard wearproof surface for the bearing elements. It was also necessary to grind the shank of the stud to close tolerances, and then to harden the ground area without hardening the threaded end of the stud to avoid brittleness and distortion of the threads.

This invention is directed to improvements in studs of the above described character and provides a stud which is equal to the prior art studs in terms of performance but which is much simpler to manufacture and less expensive than the prior art studs.

Accordingly, one object of this invention is to provide a precision stud which is easier to manufacture and less expensive than those heretofore known in the art.

Another object of this invention is to provide a hardened stud which is easier to manufacture and less expensive than those heretofore known in the art.

A further object of this invention is to provide a stud and sleeve assembly which can be used as a support for cam followers or the like.

Other objects and advantages of the invention will be apparent to those skilled in the art from the following description of one specific embodiment thereof, as illustrated in the attached drawings, in which:

FIGURE 1 is an elevation view partially in section of a cold forged stud having rolled threads formed thereon;

FIGURE 2 is an elevation view partially in section of the stud shown in FIGURE 1 with the shank thereof knurled adjacent to the head;

FIGURE 3 is a perspective view of the stud shown in FIGURE 2 with the sleeve positioned to be press-fitted over the knurled portion of the stud shank;

FIGURE 4 is an elevation view partially in section showing the sleeve member of FIGURE 3 fitted in place over the knurled portion of the shank;

FIGURE 5 is a sectional view taken along the line 5—5 of FIGURE 4; and

FIGURE 6 is an elevation section showing the stud assembly of FIGURES 4 and 5 as used in a cam follower assembly.

Referring now to the drawings, FIGURE 1 shows a prior art cold forged stud generally indicated by the numeral 10 and including a shank 11 with an enlarged head 12 formed on one end of the shank. A slot 13 is formed in the head of the stud to receive a screwdriver and screw threads 14 are rolled onto the lower end of shank 11. Stud 10 is formed in a conventional manner and as a result has a rounded fillet 15 which extends around the periphery of shank 11 where it joins the lower surface of enlarged head 12. This fillet 15 is undesirable in that if a sleeve were inserted over the shank of the stud 10 as shown in FIGURE 1, it would be prevented from abutting against the lower surface of head 12 by rounded fillet 15. It is apparent that the fillet 15 could be removed by an undesirable and costly machining operation such as a necking operation on a screw machine. In accordance with this invention, however, the same result is inexpensively obtained by knurling or serrating the shank 11 immediately adjacent to head 12 at 16, as shown in FIGURE 2, with the knurles 16 having an advantageous function which will become apparent hereinafter.

Referring to FIGURE 2, the knurls 16 on shank 11 increase the diameter of the shank to the largest diameter of fillet 15 and present a surface upon which a sleeve can be press-fitted with the end of the sleeve abutting flush against the lower surface of head 12. FIGURE 3 shows the knurled stud of FIGURE 2 with a sleeve 17 positioned to be press-fitted thereon, and FIGURE 5 shows the sleeve 17 fitted into place to complete the stud and sleeve assembly of this invention.

Sleeve 17 can be made from any suitable materials by any suitable techniques to meet the requirements of any given application of the invention. In the particular application illustrated in the drawings, the stud and sleeve assembly, generally indicated by the numeral 18 in FIGURE 4, is intended for use in a cam follower, and sleeve 17 is dimensioned and hardened to serve as the inner race of a needle bearing assembly. This can be done by hardening the outer surface of the sleeve 17 and then grinding it to precision tolerances but it can be more economically accomplished by drawing sleeve 17 from strip stock to close tolerances to eliminate the grinding operation. The exact method of forming sleeve 17 is, however, immaterial to this invention. The purpose of this invention is to provide a low cost stud assembly having a shank which is either held to precision tolerances or hardened, or preferably both. The insertion of sleeve 17 on a knurled cold forged stud will accomplish this purpose regardless of the method used in forming the sleeve. The only essential requirements for sleeve 17 are that its inside diameter be slightly smaller than the outside diameter of the knurled portion 16 of shank 11 to insure a good interference fit therebetween, and that the inside diameter of sleeve 17 be slightly larger than the outside diameter of screw threads 14 so that the sleeve 17 can be inserted into place without damaging threads 14. Sleeve 17 can be longer in the axial direction than the knurled portion 16 of shank 11, as illustrated in FIGURE 4, or it can be shorter, depending on the requirements of the particular application.

In addition to being easier to manufacture and less expensive than the prior art studs, the stud and sleeve assembly of this invention is also more adaptable in application. The same stud can be used with sleeves having different lengths or different outside diameters or different metallurgical characteristics. This means that the same cold forged stud can be used to form a wide variety of different precision studs by using different sleeves. Since the sleeves are relatively small in comparison with the studs, this appreciably simplifies the problem of storing parts for the manufacture of different precision studs and provides a further reduction in cost.

The application of stud and sleeve assembly 18 to a cam follower assembly is illustrated in FIGURE 6. In this application, a conventional cam roller 19 is rotatably journalled on the outer surface of sleeve 17 by means of needle bearing elements 20. Axial movement of cam roller 19 and needle bearing elements 20 is limited in one direction by the enlarged head 12 of the stud and sleeve assembly 18, and in the other direction by a washer or plate 21 which abuts against the inner end of sleeve 17. The inner surface of cam roller 19 is hardened to serve as the outer race for bearing elements 20, and the outer surface of sleeve 17 is hardened to serve as the inner race therefor. This stud, sleeve, needle bearing, cam roller and plate assembly is secured through an opening in a support 22 by means of a nut 23 and lock washer 24.

From the foregoing description it will be apparent that this invention provides a precision stud which is easier to manufacture and less expensive than those heretofore known in the art.

I claim:

1. A stud comprising a generally cylindriform shank portion and an enlarged head portion at one end of the shank portion and presenting a flat face perpendicular to the axis of the shank portion and facing therealong, the shank portion having a knurled portion immediately adjacent and extending away from said flat face and comprising circumferentially spaced axially extending ribs, the remainder of the shank portion endwise of the knurled portion being externally threaded, the knurled portion having a larger diameter than the threaded portion, and a cylindrical sleeve press fit mounted over the knurled portion and having flat ends disposed perpendicular to the axis of the shank portion, one said flat end snugly abutting the flat face of the head portion and the other flat end extending over one or more threads of the threaded portion, the knurled portion diameter also exceeding the inner diameter of the cylindrical sleeve which is press fit mounted thereover.

2. A cam follower assembly comprising a stud and sleeve as defined in claim 1, a support means secured on the threaded portion of the stud and including a washer having a wall portion in snug end abutment with the sleeve end remote from the enlarged head portion face and in spaced parallel relation therewith to form therewith a grooveway wherein are mounted a complement of needle bearing elements engaging with the exterior of the sleeve, the bearing elements being surrounded by and engaging with a flange portion projecting into the grooveway from a cam roller, the outer surface of the sleeve being significantly harder than the outer surface of the shank to provide an inner bearing raceway and the inner surface of said flange comprising a hardened outer bearing raceway.

References Cited

UNITED STATES PATENTS

| | | | |
|---|---|---|---|
| 148,640 | 3/1874 | Aird et al. | 74—569 |
| 916,702 | 3/1909 | Hartt | 74—569 |
| 1,664,218 | 3/1928 | Lang | 16—107 |
| 2,230,744 | 2/1941 | Disbro | 301—5.7 |
| 2,259,325 | 10/1941 | Robinson | 29—148.4 |
| 3,066,000 | 11/1962 | James et al. | 308—236 |

MILTON KAUFMAN, *Primary Examiner.*

F. C. MATTERN, *Assistant Examiner.*

U.S. Cl. X.R.

16—107; 29—525; 151—41.73; 301—5.7; 308—236